United States Patent
Goodburn

(10) Patent No.: US 7,466,897 B2
(45) Date of Patent: Dec. 16, 2008

(54) INDICATOR DEVICE FOR RECEIVER APPARATUS WITH DATA MEMORY

(75) Inventor: Mark Goodburn, Leeds (GB)

(73) Assignee: Pace Micro Technology Plc, Saltaire, Shipley (GB)

( * ) Notice: Subject to any disclaimer, the term of this patent is extended or adjusted under 35 U.S.C. 154(b) by 934 days.

(21) Appl. No.: 09/760,313

(22) Filed: Jan. 11, 2001

(65) Prior Publication Data

US 2001/0008426 A1    Jul. 19, 2001

(30) Foreign Application Priority Data

Jan. 13, 2000    (GB)    ................................ 0000588.4

(51) Int. Cl.
*H04N 9/81* (2006.01)
(52) U.S. Cl. .............................. 386/31; 386/27; 386/10; 386/6; 386/3
(58) Field of Classification Search .................. 360/27; 348/553, 563; 356/237; 253/31; 386/31, 386/3, 6, 68, 32
See application file for complete search history.

(56) References Cited

U.S. PATENT DOCUMENTS

| | | | | |
|---|---|---|---|---|
| 4,100,607 A * | 7/1978 | Skinner | ........................ | 386/59 |
| 4,929,936 A * | 5/1990 | Friedman et al. | ............ | 345/618 |
| 5,311,373 A * | 5/1994 | Murabayashi et al. | ....... | 386/104 |
| 5,329,320 A * | 7/1994 | Yifrach | ....................... | 348/738 |
| 5,424,772 A * | 6/1995 | Aoki et al. | ............... | 348/220.1 |
| 5,475,835 A * | 12/1995 | Hickey | ..................... | 707/104.1 |
| 5,794,226 A | 8/1998 | Yoneyama | | |
| 5,889,920 A | 3/1999 | Compoint et al. | | |
| 5,909,548 A * | 6/1999 | Klein et al. | .................. | 709/217 |
| 6,006,276 A * | 12/1999 | MacCormack et al. | ...... | 709/253 |
| 6,041,361 A * | 3/2000 | Wilson et al. | ............... | 709/253 |
| 6,049,353 A * | 4/2000 | Gray | ........................... | 348/159 |
| 6,246,441 B1 * | 6/2001 | Terakado et al. | ............ | 348/552 |
| 6,424,385 B1 * | 7/2002 | Koyama et al. | ............. | 348/734 |

FOREIGN PATENT DOCUMENTS

WO    WO98/25404    6/1998

OTHER PUBLICATIONS

Pulication—DVR-1000/DVPC-1000, pp. 1-20.

* cited by examiner

*Primary Examiner*—Thai Tran
*Assistant Examiner*—Helen Shibru
(74) *Attorney, Agent, or Firm*—Head, Johnson & Kachigian

(57) ABSTRACT

Electrical apparatus for processing received digital data into audio and/or video formats for listening via speakers and/or viewing via a display screen connected to the apparatus. The apparatus includes a memory means in which said received data can be stored for subsequent selective access by the user of the apparatus. The apparatus is provided with a display panel (2) and the panel and/or the display screen includes a plurality of light sources (6) and the illumination or non-illumination of the light source is controlled to indicate the selected mode of operation of the memory so as to provide a visual indication of the same to the user, and, if active, the illumination or non illumination of the light sources (6) is determined by the particular active mode of the memory.

19 Claims, 2 Drawing Sheets

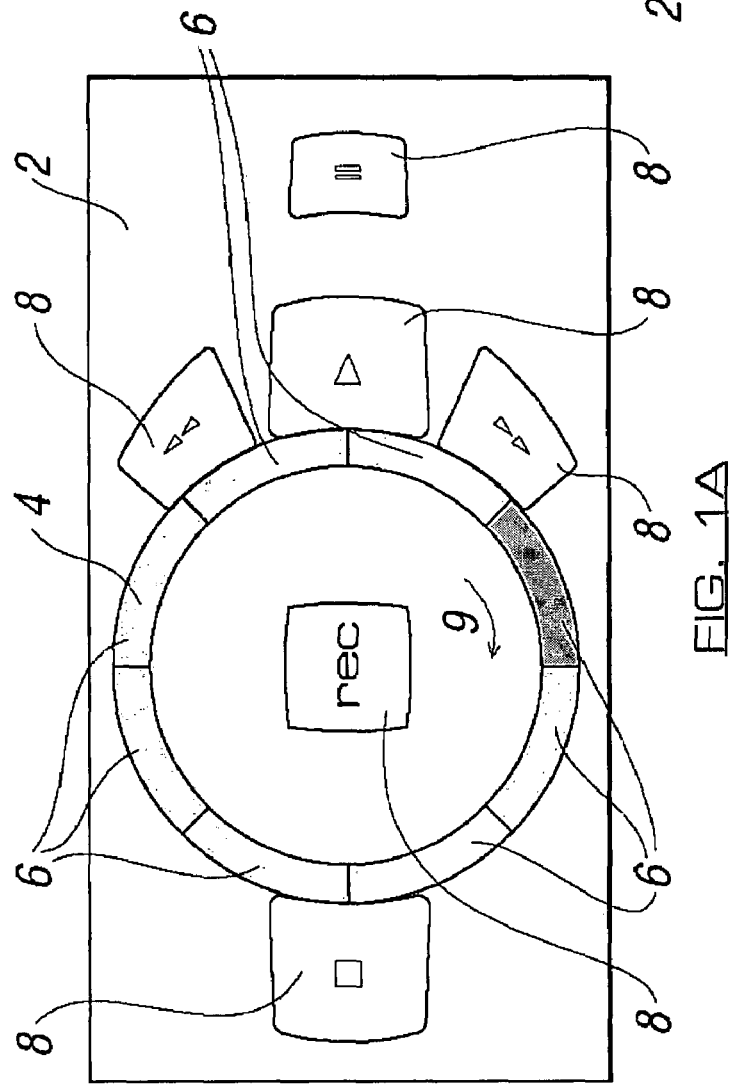
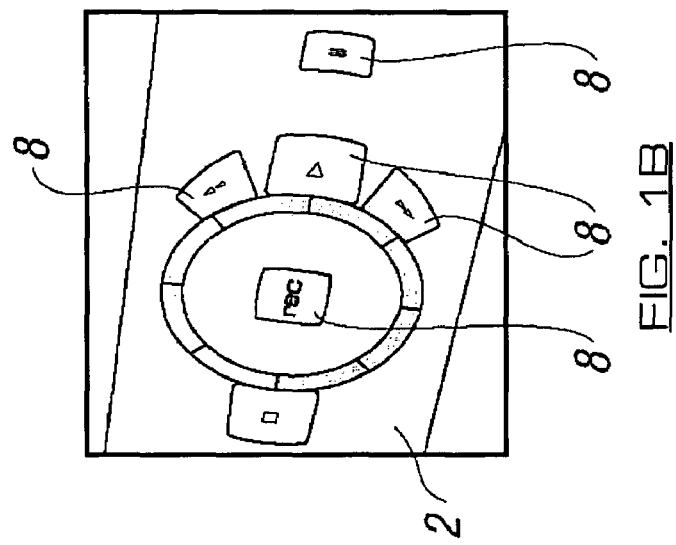

“INDICATOR DEVICE FOR RECEIVER APPARATUS WITH DATA MEMORY”

CROSS-REFERENCE TO RELATED APPLICATIONS

This application claims priority to GB Application No. 0000588.4 filed 13 Jan. 2000.

STATEMENT REGARDING FEDERALLY SPONSORED RESEARCH

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

The invention to which this application relates is the provision of an indication means which allows a user of electrical apparatus which includes a memory to be provided with an indication of the mode of operation of the memory and the apparatus in general. In particular, the invention is directed towards the provision of a hard disk memory installed in electrical apparatus which is capable of receiving and processing digital data which is broadcast from a remote location.

The invention is particularly directed towards the relative new form of electrical apparatus which is provided with the facility to receive digital data which is broadcast from a remote location and transmitted to the receiver via any of satellite, cable or terrestrial broadcast systems. The digital data which is transmitted and received is processed by the receiver decoding the data from the encoded format in which the data is broadcast, compiling streams of the data and subsequent transmission of the data in video and/or audio format, typically via a television set connected to the receiver or which has the receiver provided as an integral part thereof, in the form of recognizable television programs.

The use of digital data broadcast systems has meant that a large number of television channels can now be received via said receivers and, while this has considerably increased the choice to the user it also has meant that the user is typically not able to watch all of the programs and/or information which they may wish to watch as it is transmitted at the same time. In order to solve this problem, receiver apparatus is now developed which includes a memory, typically a hard disk memory, which is of sufficient capacity to allow the storage of received data which relates to part of or one or a number of designated television programs and from which data the audio and/or video and/or text can be generated at a later time. This memory can be controlled by the user of the apparatus to store or record data from selected sources, the playing of the programs generated from the stored data can be selected and facilities can be provided which allows the user to search through the data at speed in forwards or backwards directions as well as having the ability to "stop" the program at particular times. While this facility is undoubtedly of benefit there is a need for the user to be able to identify and distinguish the mode of operation of the memory in the receiver apparatus at any time and the aim of the present invention is to provide an indication means which allows this indication to be provided.

BRIEF SUMMARY OF THE INVENTION

In a first aspect of the invention there is provided electrical apparatus for processing received digital data into audio and/or video formats for listening via speakers and/or viewing via a display screen connected to the apparatus, the apparatus including a memory means in which the received data can be stored for subsequent selective access by the user of the apparatus, characterized in that the apparatus is provided with a display panel and the display screen and/or the display panel includes a plurality of light sources, and the illumination or non-illumination of the light sources is controlled to indicate the selected mode of operation of the memory so as to provide a visual indication of the same to the user, and, if active, the illumination or non-illumination of the light sources is determined by the particular active mode of the memory.

Typically, the electrical apparatus is a broadcast data receiver which receives broadcast digital data via satellite, cable or terrestrial systems and which subsequently processes and combines received data streams into recognizable television programs such as movies, sports events and the like and/or text services such as teletext, electronic program guides and the like.

The memory is typically a Hard Disk memory provided in the receiver apparatus housing or, alternatively, connected thereto. The housing typically comprises a display panel which is provided to be viewed by the user and may include selection buttons for various services or modes of operation of the apparatus, reception slots for viewing cards and the like.

In accordance with the present invention, the receiver apparatus display panel also includes indication means in the form of a series of light sources. Typically, each light source is independently controlled to be in an off (non illuminated) or on (illuminated) state, and the control is linked to the mode of operation of the memory in the apparatus. The light sources are typically provided so that the sequential illumination of the light sources can be used to indicate particular modes of operation so that the pattern or sequence of illumination of light sources is used in addition, or instead of, placing some or all of the light sources in on or off conditions.

In one embodiment, the light sources can be LED light sources, or alternatively may be back lit segments or any suitable light source and may include one light source split into a number of segments to represent the plurality of light sources. In order to provide further indication, the light source can be provided in different colors or interchangeable colors.

In a second aspect of the invention there is provided electrical apparatus which is capable of processing received digital data into audio and/or video formats for listening via speakers and/or viewing via a display screen connected to the electrical apparatus, the apparatus including a memory means in which digital data can be stored for subsequent selective access by the user of the apparatus, characterized in that the apparatus is provided with a display panel and the display screen and/or the display panel includes a plurality of light sources and the illumination or non-illumination of the light sources is controlled such that when a control command is made by the user to the apparatus which alters the mode of operation of the memory means and/or if the user makes a selection to alter the display of the video and/or audio which is generated from data previously stored in the memory means a visual indication of the same is provided by the light source. Typically, the control commands can be made by the user via the selection buttons on the apparatus or by a remote control device from which signals can be received and processed by the apparatus.

It will, therefore, be appreciated that the indication means provides two levels of indication to the user, a first level which indicates whether the memory is active, sending data from the memory to allow video and/or audio generation, or recording data received by the apparatus, and a second level which indicates to the user the format of the video and/or audio display generated from previously stored data, i.e., the speed of display, the direction of display and/or the like.

The use of the indication means as herein described is particularly important with respect to the receiver apparatus and the mode of operation of the memory therein. The invention is in contrast to the requirements of personal computers including a hard disk memory where the memory is only used to retrieve information already stored thereon or to store information onto the same and so, at best, a single light source can be provided to indicate whether the memory is active or not. However, in the current apparatus the user is able to not only store and retrieve information but also search through the data which is held and, furthermore, determine the speed of the video and/or audio display which is generated from the stored data, and this is something which has not previously been required with respect to hard disk memory apparatus.

BRIEF DESCRIPTION OF THE DRAWINGS

A specific example of the invention is now described with reference to the accompanying FIGS. 1a and 1b, which indicate one format of visual indication means in accordance with the invention.

DETAILED DESCRIPTION OF THE INVENTION

Figure 2:
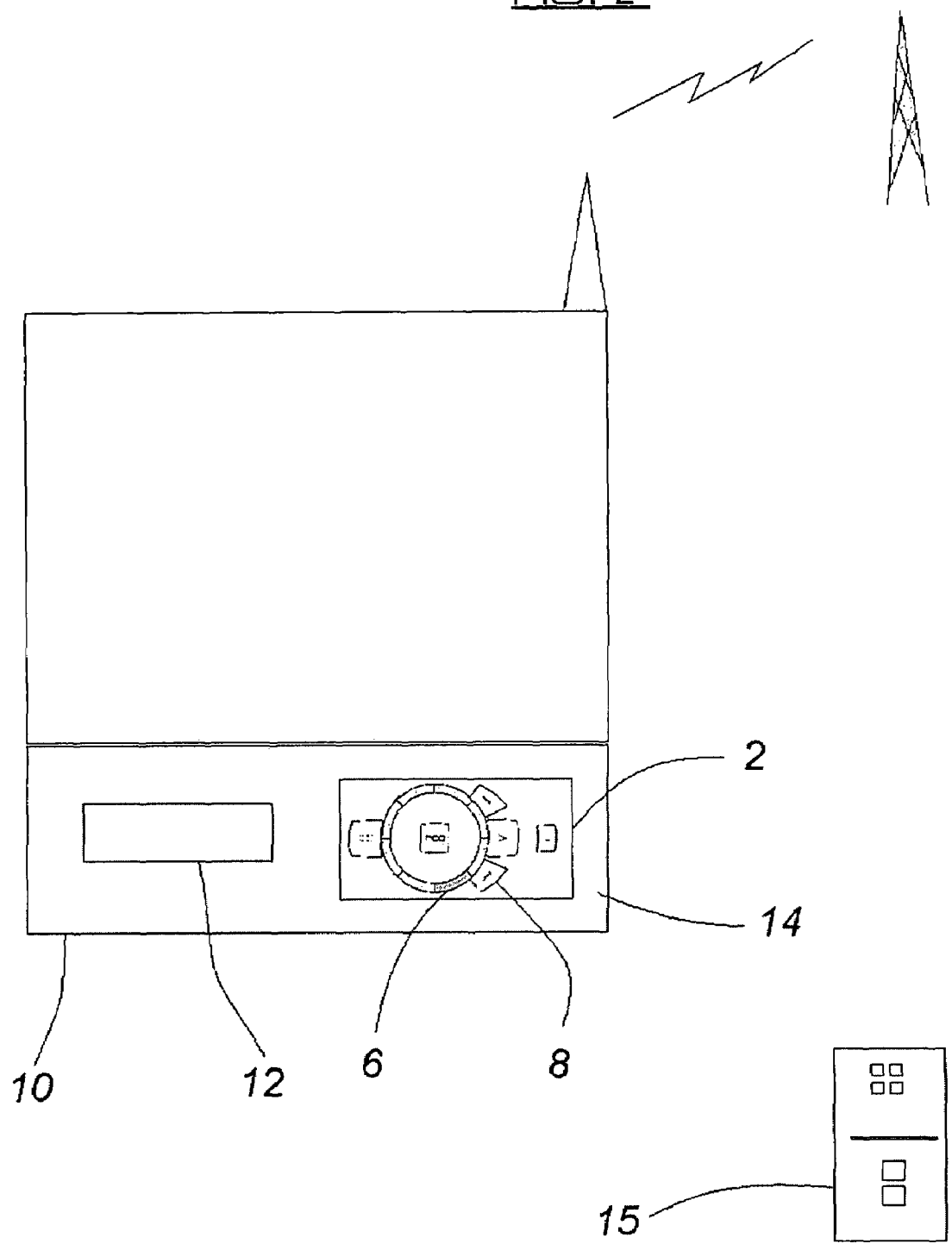
FIG. 2 shows the electrical apparatus for processing received digital data into audio and/or video formats

In the figures there is illustrated a portion of a display panel 2 which is mounted as part of the receiver apparatus housing 14. Receiving and processing apparatus 10 is provided with housing 14 to allow digital data, which is broadcast to the receiver via any of the cable, satellite or terrestrial transmission systems, to be processed and displayed as audio, video or text display via a television connected thereto or in which the receiver apparatus may be integrally provided.

Also provided, in this case within the receiver, is a hard disk memory means 12 which is of sufficient capacity to store the received data for specified television programs over a prolonged time in response to user entered commands. The data can subsequently be retrieved and displayed via the television set upon the reception of user commands. Furthermore, aspects of the format of the display of the data can be controlled by the user, such as speed of display of audio and/or video data.

The indication means 4 in accordance with the embodiment shown is provided with a number of light sources within a circular configuration as shown. Furthermore, in this particular format, the light sources 6 can be colored red or colored green.

As indicated previously, the indication means is provided to show two levels of indication to the user. The first level relates to the actual operating mode of the memory, and in one form this is provided by the Record mode indicated by the sequential illumination of the lights sources 6 in red color so as to provide a "rotational" effect. When the memory is not active, there is no illumination of any of the light sources and when the memory is operating to transmit previously stored data to generate video and/or audio, the light sources are illuminated sequentially in green color to provide a "rotating" effect.

In use, this "play" indication also acts as an indication to the user of the audio and/or video which they should be hearing/seeing via the television at that time so that they would expect to see the previously stored data when the light sources 6 are being illuminated sequentially in green color. If the user wishes to visually search through the video display in a forward direction, they can select to show the video data at a faster speed and if this command is entered, the speed of the sequent of illumination of the light sources 6 is increased. If the user selects to search through the video in a backwards direction at greater speed, the sequence of illumination of the light sources 6 is reversed so as to provide a reverse "rotational" effect and increase in speed in comparison to the "play" display. If the user selects to freeze the video display at a particular time, a light source blinks on and off. A series of control buttons 8 are provided adjacent the display for the control of the functions, but it is envisaged that a remote control device 15 will be more commonly used. Light sources can be provided adjacent the play and record buttons to provide a visual indication of the selection of the buttons, the lights being green and red with respect to the respective buttons 8.

Preferably, in use, the operation of the indication means can be controlled between demonstration mode, in which the user can be shown a demonstration of the various indication configurations, an active mode as described herein, and an in-active mode in which the light sources are not illuminated with the exception of one light source which is illuminated when the memory is in a data recording mode.

It is noted that the light source display can also be provided on a display screen connected to or communicating with the receiver apparatus.

Thus, there is provided clear visual indication of the mode of operation of the data memory means which is provided as an integral part of the apparatus. As the memory means is an integral part of the receiver there is no other way for the user to easily be aware of the mode of operation of the memory means and so the generation of the display in conjunction with and in relation to the mode of operation of the memory means is an important and inventive feature.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

The invention claimed is:

1. Electrical apparatus for receiving digital data broadcast from a remote location and processing received digital data into audio and/or video formats for listening via speakers and/or viewing via a display screen connected to the apparatus, said apparatus comprising:
   a memory means in the form of a hard disk memory having at least one selectable mode of operation and at least one selectable format in which said received data can be selectively stored for subsequent selective access by a user of the apparatus and a display panel;
   the display panel having therein a circular configuration formed by a plurality of light sources arranged to illuminate and non-illuminate in a series around the circular configuration, and illumination or non-illumination of said plurality of light sources arranged in a series around the circular configuration is controlled with respect to the mode of operation of the apparatus and memory at that time so as to provide a visual indication of operation of at least one mode of operation of the hard disk memory to the user, and the plurality of light sources having interchangeable colors;

a variable speed/variable direction sequential illumination or non-illumination and interchangeable color illumination of the plurality of light sources arranged to illuminate and non-illuminate in a series around the circular configuration is determined by the particular active mode of the apparatus if the apparatus is active and wherein;

the color of illumination of the plurality of light sources arranged to illuminate and non-illuminate in a series around the circular configuration is illuminated by the variable speed/variable direction sequential illumination to provide a rotational effect and defines whether the memory means is in a recoding mode in which received data is being stored therein or in a data retrieve mode in which previously stored data is being retrieved; and the direction and the sequence of the variable speed/variable direction sequential illumination of the plurality of light sources arranged to illuminate and non-illuminate in a series around the circular configuration provides a forward and backward rotational effect and indicates a particular manner in which the retrieved data or data being received is being processed and/or displayed to the user.

2. Electrical apparatus according to claim 1 wherein said electrical apparatus is a broadcast data receiver which receives digital data via a member of the group consisting of satellite, cable and terrestrial systems and which subsequently processes and combines received data streams into recognizable television programs and/or text services.

3. Electrical apparatus according to claim 1 wherein said hard disk memory means is provided in a housing of the broadcast data receiver or connected thereto.

4. Electrical apparatus according to claim 3 wherein said housing of the broadcast data receiver includes a display panel and selection buttons for services or modes of operation of the apparatus.

5. Electrical apparatus according to claim 1 wherein each light source of said plurality of light sources in a series is independently controlled to be in an off or on condition and the control is linked to the operation of said hard disk memory means of said electrical apparatus.

6. Electrical apparatus according to claim 5 wherein variable speed and variable direction sequential illumination of said plurality of light sources can be used to indicate particular modes of operation so that a pattern or sequence of illumination of said plurality of light sources is used.

7. Electrical apparatus according to claim 1 wherein said plurality of light sources include light emitting diodes.

8. Electrical apparatus according to claim 1 wherein said plurality of light sources include back lit segments.

9. Electrical apparatus according to claim 1 wherein one light source is split into a number of different segments to represent said plurality of light sources.

10. Electrical apparatus according to claim 1 wherein said light sources are provided from the group consisting of different colors, interchangeable colors and sequence of colors to provide an indication of mode of operation.

11. An electrical apparatus according to claim 1 wherein said apparatus is a broadcast data receiver which receives digital data via a member of the group consisting of satellite, cable and terrestrial systems and which subsequently combines received data streams into recognizable television programs and/or text services.

12. An electrical apparatus according to claim 1 wherein said apparatus is a broadcast data receiver which receives digital data via a member of the group consisting of satellite, cable and terrestrial systems and which subsequently processes received data streams into recognizable television programs and/or text services.

13. Electrical apparatus according to claim 1 wherein activation of said at least one selectable mode of operation of said hard disk memory means is indicated by the variable speed/variable direction illumination of said plurality of light sources in a color.

14. Electrical apparatus according to claim 1 wherein activation of said at least one selectable format of said hard disk memory means is indicated by the illumination of said plurality of light sources in a color.

15. Electrical apparatus according to claim 1 wherein said at least one selectable format is a speed of the video and/or audio display generated by said hard disk memory means.

16. Electrical apparatus according to claim 1 wherein the speed of the variable speed/variable direction illumination of the light sources further indicates the particular manner in which the retrieved data is being processed and/or displayed to the user.

17. Electrical apparatus according to claim 1 wherein one of said at least one selectable format of said hard disk memory means is indicated by blinking of said plurality of light sources in a color.

18. Electrical apparatus for processing received digital data into audio and/or video formats for listening via speakers and/or viewing via a display screen connected to the electrical apparatus, said apparatus comprising:

a hard disk memory means in which digital data can be stored for subsequent selective access by a user of the electrical apparatus; and a display panel having a plurality of light sources arranged to illuminate and non-illuminate in a series in a circular configuration, and a variable speed/variable direction sequence of illumination or non-illumination of said plurality of light sources is controlled such that when a control command is made by a user to the electrical apparatus which alters a mode of operation of the hard disk memory means and/or if the user makes a selection to alter the display of the video and/or audio which is generated from data previously stored in the hard disk memory means a visual indication of the same is provided by said light sources, and at a first level the color of illumination of the light sources defines whether the memory means is in a recording mode in which received data is being stored therein or a data retrieve mode in which previously stored data is being retrieved and in a second level the direction sequence and speed of the variable speed/variable direction illumination of the light sources indicates the particular manner in which the retrieved data is being processed and/or displayed to the user.

19. Electrical apparatus according to claim 18 wherein said control commands can be made by the user via selection buttons included in the apparatus or by a remote control device from which signals can be received and processed by the apparatus.

* * * * *